Figure 5:
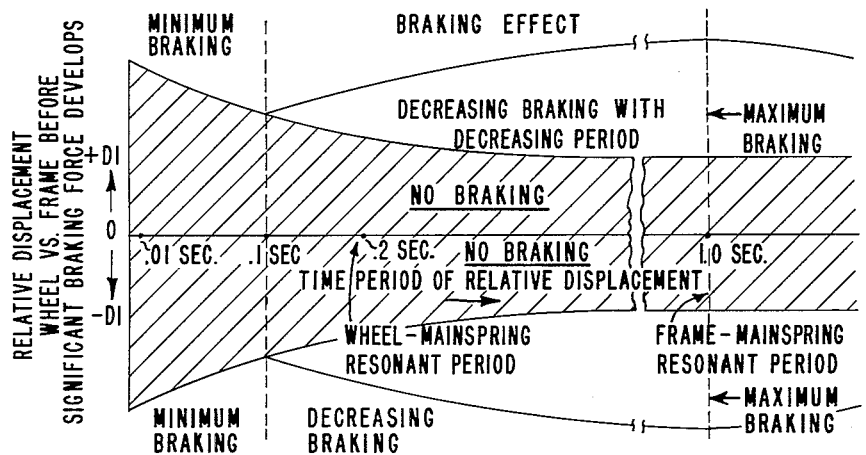

May 26, 1964     L. H. MESSINGER     3,134,462
SHOCK-ABSORBER FRICTION BRAKING MEANS
Filed July 27, 1961     3 Sheets-Sheet 1
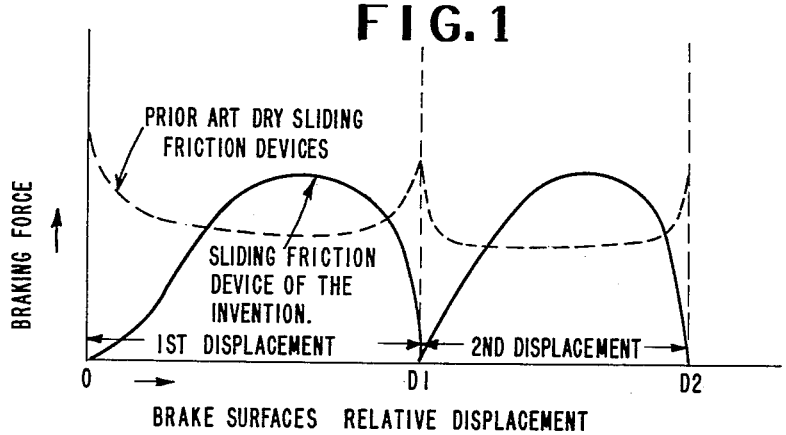
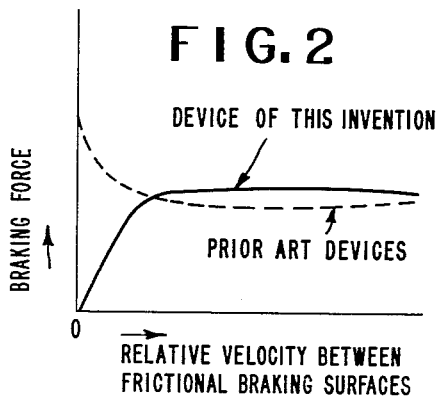 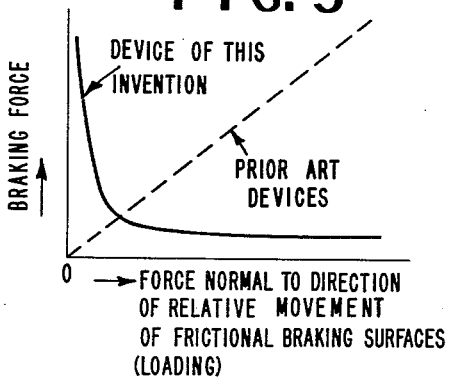
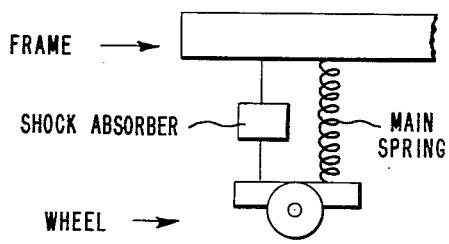
*INVENTOR*
LESTER HUBERT MESSINGER
BY
*ATTORNEY*

May 26, 1964 L. H. MESSINGER 3,134,462
SHOCK-ABSORBER FRICTION BRAKING MEANS
Filed July 27, 1961 3 Sheets-Sheet 3
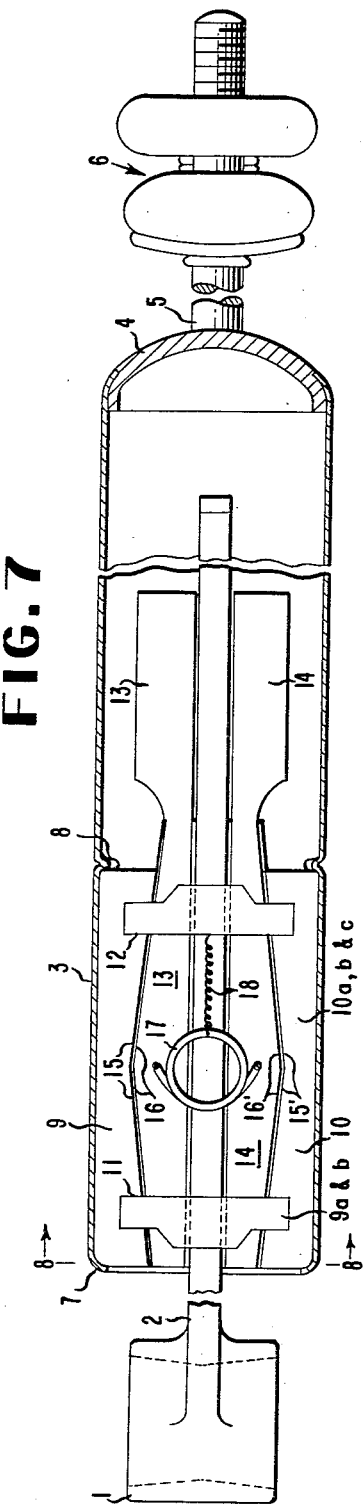
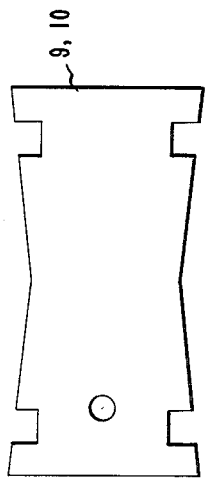
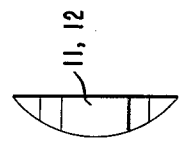
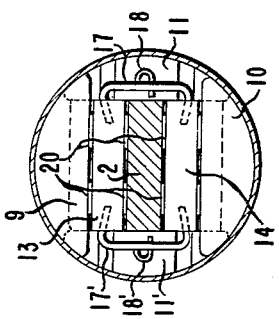
INVENTOR
LESTER HUBERT MESSINGER
BY
ATTORNEY

United States Patent Office 3,134,462
Patented May 26, 1964

3,134,462
SHOCK-ABSORBER FRICTION BRAKING MEANS
Lester Hubert Messinger, Newark, Del., assignor to E. I. du Pont de Nemours and Company, Wilmington, Del., a corporation of Delaware
Filed July 27, 1961, Ser. No. 127,317
5 Claims. (Cl. 188—129)

This invention relates generally to a new and improved braking arrangement, one having special significance in the field of cushioning or resiliently supporting one body against motion relative to another body with which it is associated. More specifically, one application of some significance involves the cushioned mounting arrangement of a vehicle frame assembly upon its wheels. The usual application of cushioned mounting techniques to vehicle frame-wheel combinations involves a main spring or resilient means acting between the frame and a given wheel in conjunction with a braking device usually referred to as a shock absorber or snubber also acting between the frame and the wheel to limit and/or vary the main spring action.

One preferred application of my invention specifically involves such a general arrangement in which my novel improved braking device or shock absorber device is combined with a resilient means to greatly improvide the functioning of the entire cushioning arrangement. The shock absorber embodying principles of my invention possesses novel structural features and functions in a unique improved manner. The particular shock absorber of the invention utilizes dry sliding friction to develop its retarding force and is unique not only in the way in which the braking force is developed and controlled after actuation of the shock absorber device but also in the way in which the device is actuated to initiate the snubbing action.

In order to simplify the discussion, the problem of cushioning vehicle frame assemblies will be limited to describing the actions and interactions in a vertical direction of a cushioned frame assembly with one wheel assembly. As is the general case where the frame is supported on the wheel by an interposed main spring, the frame-main spring movements in the vertical direction, after being acted upon by a main spring deflecting disturbing impulse in a vertical direction, will be those of simple harmonic motion at a frequency determined by the mass of the frame supported by the spring and the spring characteristics, with gradually decreasing amplitude. This will be recognized as the natural body or frame frequency which in many conventional automobiles gives a body period of about one second. Of course, the wheel assembly-main spring combination may, after such disturbing impulses, move similarly at its own higher frequency determined by the mass of the wheel assembly and the main spring characteristics.

As the frame-spring-wheel proceeds along, supported on a road surface, the wheel will encounter many deviations from a true horizontal planar surface. These deviations, both upward and downward, when encountered by the wheel are translated into deflections of the main spring and are of many types, varying as to amplitude, rate of displacement, period, and frequency. These deflections of the main spring result in the application of forces to the frame assembly which may put it in vertical oscillatory movement. In order to control and limit such relative movement between the frame and the wheel assembly, it is the practice to additionally connect between the frame and wheel assembly a braking device or shock absorber device. Such devices usually brake or retard main spring deflection so that the initial deflection and return or rebound action therefrom will not have unduly violent effects upon the frame, and bottoming of the main spring and wheel assembly with respect to the frame is avoided. This arrangement requires a difficult compromise between the main spring characteristics and the braking device characteristics. If the braking device or shock absorber does not develop sufficient retarding force then the main spring must have a high spring force per unit deflection (be made quite stiff). This reduces the "bottoming" problem but the stiff main spring will give a shorter body period tending to cause passenger discomort for those riding on the frame. On the other hand, if the braking device or shock absorber quickly develops a high retarding force and the main spring force per unit deffection is lowered (made less stiff) the body period will be lengthened to increase passenger comfort but under certain sharp road deviations and high main spring deflection rates associated therewith the shock absorber or braking device will apply its high braking force to main spring deflection which means this braking force is transmitted directly to the frame causing accelerations which increase passenger discomfort.

For many road conditions this difficult compromise has been fairly satisfactorily achieved in current automobiles. However, there are a number of riding conditions for which present automobiles do not or cannot provide satisfactory cushioning action. These conditions cause fairly limited amplitude short duration, high rate of displacement, impulses on the vehicle wheel assembly. These impulses could be reasonably satisfactorily handled by the main spring deflections of low amplitude but due to the prompt braking action of the shock absorber connected between the wheel assembly and the body, they are transmitted directly and substantially undiminished to the frame and its passengers causing uncomfortable shocks, vibration and noise. Examples of riding conditions causing such undesirable effects are those occurring at railroad crossings, and when snow chains are affixed to the wheels.

Certain prior art shock absorbers have recognized that it is desirable under some conditions to provide lost motion connections between the shock absorber and either the frame or the wheel assembly in order that the amplitude of a wheel displacement with respect to the frame must reach a certain minimum level before the shock absorber comes into play to develop the retarding force on the wheel which also acts upon the frame in the opposite direction. This solution to the problem presents a number of difficulties since it means that the shock absorber is brought into operation with an appreciable impact when it is finally actuated. This causes noise, aggravated wear and stresses, and then undesirable effects. Other prior art devices have attempted to solve the problem by "one-way" shock absorbers which permit an initial displacement of the wheel with respect to the frame, or a main spring deflection in one direction without retardation or braking, and then brake the return or rebound displacement or deflection in the opposite direction. Other known devices will simply provide a lower retardation force to initial deflection of the main spring in one direction and a higher retarding force upon return or rebound deflection in the opposite direction.

Known shock absorbers have utilized both hydraulic throttling principles and dry sliding friction forces to develop their retarding or braking forces. The hydraulic types are especially susceptible to the transmission of undesirable shocks from high rate wheel impulses directly to the frame from the wheels since their braking forces are usually developed in a manner which is proportional to the square of the velocity of the impulse on the wheel. Hydraulic devices also must face the problems of loss of liquid and viscosity variations. Those known braking devices utilizing dry sliding friction to develop the retarding action, while not possessing the disadvantages of the hydraulic type, nevertheless are subject to an irregular action caused by the conventional brake surface materials in which the coefficient of friction of the brake surface materials drops from a relatively high value under static or rest conditions to a much lower value when relative motion is established between the engaged friction braking surfaces. This means that moving from static condition of the braking surfaces to a condition of relative motion between the surfaces the frictional forces vary sharply from very high to relatively low values which causes an initially high braking force which then suddenly drops to a low value. The reversal of this situation, that of changing from a condition of some relative motion between the braking surfaces to a condition of no relative motion causes sudden clamping or braking as zero relative motion is approached. Sometimes highly undesirable oscillations or chatter develops due to the greatly increased friction as zero relative motion is approached. The undesirable effects of such action in shock absorber operation is believed to be obvious. Certain of the dry sliding friction braking devices or shock absorbers have used a system in which the conventional frictional braking surfaces are wedged together as relative motion occurs between these surfaces. This increases the braking or retarding effect as relative motion occurs between the surfaces so that the effect of the lower coefficient of friction between moving surfaces is offset. However, great care must be taken to insure that the wedging action is not such that a somewhat irreversible "lock-up" condition results when maximum braking action and zero relative motion occurs between the brake surfaces upon bringing relative speed between them from a given value to zero. This "locked-up" condition would obviously prevent the smooth reversal of relative motion between the brake surfaces, and an even build up of relative motion to any level from zero; an undesirable unacceptable result in necessarily continuous shock absorber operation. Entering and breaking free of the "locked-up" condition between the braking surfaces involves the abrupt changes in forces and accelerations which are inconsistent with satisfactory cushioning and passenger comfort in vehicles. If there is no independent means for releasing a wedged friction brake, a very high frictional opposing force occurs upon recurrence or reversal of the relative motion. In other words it has been difficult, if not impossible, to achieve a smoothly and gradually developed braking force (in dry sliding friction devices) upon going from a condition of some level of relative motion between the frictional braking surfaces to a condition of no relative motion between them, and upon a reversal of this situation attaining a smoothly gradually released retarding force upon going from the zero relative motion condition to that of some given relative velocity. In addition, the prior art does not appear to have achieved at all a wedge type sliding friction braking device having braking surfaces which, without brake releasing means and upon smoothly braking relative motion between them in one direction, permits a recurrence of motion in the same direction or a reversal of such relative motion immediately without developing an immediate high retarding or sticking action to unlock the brake surfaces on the change of the relative motion from zero to a finite level in the opposite direction or in the same direction.

The prior art dry sliding frictional braking devices develop a high retarding force at both the beginning and the end of a relative displacement of the braking surfaces in a given direction with a relatively lower retarding force between the limits of the displacement. This is of course, related to the undesirable chattering,"locking-up," vibrating action and other undesirable conditions described in the preceding discussion.

It is one object of this invention to provide a novel dry sliding friction braking arrangement which represents a substantial improvement over the hydraulic and dry sliding friction brakes or shock absorbers previously known, an arrangement which benefits from the advantages of dry sliding frictional shock absorbers over the liquid hydraulic type and which also overcomes the shortcomings of previously known dry sliding friction brakes.

It is another object of this invention to provide an improved shock absorber which develops a smoothly controlled increasing and then decreasing braking force as relative displacement occurs between the braking surfaces, without exhibiting the undesirably high retarding forces at the beginning and end of such displacement as exhibited by conventional sliding friction shock absorbers and friction surfaces.

It is a further object of this invention to provide an improved braking device in which the varition of the braking or frictional forces between the relatively displaced frictional braking surfaces acts to establish a limiting relative velocity between the surfaces but does not act positively or "gram" to bring the relative velocity to zero in the manner of the "locked-up" conventional frictional brake devices.

It is yet another object of this invention to provide a braking device structure in which the braking surfaces are wedged together to markedly increase the force normal to the direction of relative motion between them and in which a very small angle of wedge can be utilized to give great increase in the normal and braking force without getting into the "sticking" or "locked-up" condition which requires a high unlocking force upon reversal of the relative motion between the braking surfaces or a recurrence of motion in the same direction.

A further object and advantage of the invention is the provision of a unique improved shock absorber which utilizes frictional braking surfaces which are wedged together upon relative movement between them but which are constructed and arranged to produce, without lost motion spacing, a significant time delay in actuation to allow high rate of displacement, short duration, low amplitude impulses imposed upon one of the braking surfaces to dissipate or become substantially diminished before appreciable frictional braking force can be developed on the other braking surface of the device.

Another object is the provision of an improved resilient cushioning arrangement, comprising in combination, my unique shock absorber and a resilient means acting together between two relatively movable bodies, to retard, deflections of the resilient means in two opposed directions, if above a given predetermined amplitude, and at rates at or below the rate of resilient means deflection at the natural or resonant frequency determined by resilient means and one of said bodies, and said arrangement also acting to reduce or eliminate the retarding action at resilient means deflections at rates greater than the rate of resilient means deflection at the natural frequency of the resilient means and said one of said bodies and below a given predetermined amplitude.

It is a further object of this invention to provide a sliding friction wedge type braking device which utilizes an extremely low wedging angle to greatly multiply the forces normal to braking surface relative movement and yet cannot become "locked-up" or enter a condition requiring significant forces to free the wedge for further braking action upon a recurrence or a reversal of braking surface relative movement.

Yet another object is to indicate a surprising and unique discovered method of use of a group of anti-friction materials; the use of such materials for dry sliding friction braking surfaces and for the actuating wedge elements for such surfaces to develop highly controllable braking forces in braking devices and shock absorbers. It also seems clear that valuable similar use of these materials may be made in the field of friction clutches and controlled force transmitting systems.

Figure 6:
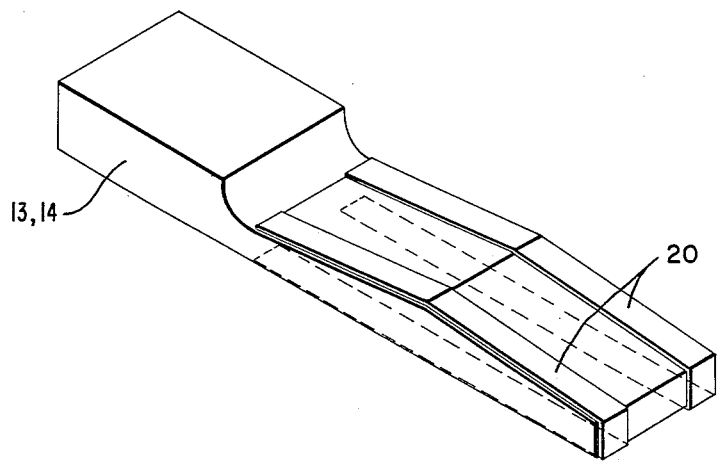

Other objects and advantages will appear from a consideration of the following specification, claims, and the accompanying drawings in which:

FIG. 1 is a comparative general graphical representation of the variation in braking force developed during a given displacement of braking surfaces for prior art wedge type sliding friction braking devices and the braking device of the present invention, FIGURE 2 is a comparative general graphical representation of the variation of braking force with relative velocity of the braking surfaces for the prior art wedge type sliding friction braking devices and the device of the present invention, FIGURE 3 is a comparative general graphical representation of the variation in braking force with respect to the transverse or normal loading on the longitudinally relatively moving braking surfaces for the prior art wedge type sliding friction devices and the device of this invention, FIGURE 4 is a schematic showing of the general combinations of basic components of a vehicle frame-wheel cushioned mounting arrangement, FIGURE 5 is a somewhat graphical showing the areas of impulse or displacement braking with respect to impulse amplitude and time period, and also indicating the relationship of body resonant period and wheel resonant period to the varied braking action, FIGURE 6 is an isometric projectional view of one of the sliding brake shoe elements used in a preferred embodiment of shock absorber apparatus embodying principles of this invention showing the location of the bearing material and frictional contact portions, FIGURE 7 is a longitudinal side elevational view of a preferred embodiment of a shock absorber device embodying principles of this invention, with the outer casing element shown in longitudinal cross section to illustrate the relationships and cooperation of the interior elements, FIGURE 8 is a transverse cross sectional view of the device of FIGURE 7 taken on line 8—8 of that figure, FIGURES 9a and b are plan and end views of one of the four identical wedge supporting and positioning elements of the device of FIGURE 7, FIGURES 10a, b, and c are plan, side, and end views of one of the two identical wedge elements of the device of FIGURE 7.

Although it is believed that the improved braking device of this invention has broad application in many fields, the device will be discussed primarily in connection with its application as a shock absorber or snubber in the field of cushioned mountings between a vehicle frame assembly and one of its wheel assemblies. A typical schematic general arrangement is shown in FIGURE 4 in which a main spring and a shock absorber unit are interposed and engaged between a vehicle frame assembly and a wheel assembly to accommodate and control relative motion between them primarily in a vertical direction.

Wedge-actuated sliding wedge type friction brakes or shock absorbers are generally known in such combinations. However, as discussed earlier in this specification their functioning has not been satisfactory due to the effects of the coefficients of friction encountered in the available conventional materials. Since the static coefficient of friction of such materials is much higher than their dynamic coefficients of friction, the retarding force or resistance to movement between the conventional frictional braking surfaces varies as indicated in dotted lines in FIGURES 1, 2 and 3 to produce the undesirable action discussed previously.

I have discovered a modified wedge-actuated sliding wedge friction brake arrangement which overcomes the previous difficulties with related prior art devices and which functions in a markedly improved manner to achieve an unexpected and highly useful action. Essentially the basic aspect of my invention involves the provision of brake friction areas and wedging surfaces essentially comprised of special materials such as those having similar properties to those exhibited by polytetrafluoroethylene. The use of such material at these areas and surfaces causes the retarding forces to develop almost in an opposite relation to the way in which such forces have developed in the prior art devices. This controlled development of retarding forces makes possible the time delay which enables my shock absorber to ignore high rate of displacement impulses below a predetermined total displacement on the wheel assembly which in prior art devices are transmitted directly to the frame assembly producing undesirable shocks, noise, and vibration. The way in which the retarding forces are controlled in the shock absorber embodying my invention also makes possible a "non-sticking," "self-unlocking" wedge action even when very low wedging angles are used. My braking device produces no initial resistance to a reversal of relative displacement even after having braked and halted an impulse in a first direction. This is a decided advantage over the prior art devices and is accomplished directly in a device of very simple construction.

The use of the special materials may be accomplished in a number of ways. The parts may be made of the solid material having the special properties, parts may be made of ordinary materials covered at the key points or entirely with a layer or coating of the special materials.

One way to achieve the desired structural arrangement is by using strips of a broad-woven polytetrafluoroethylene fabric with a cotton back which may be adhesively bonded in the necessary areas. Such fabric is commerically available from the Russell Manufacturing Company of Middletown, Connecticut and is identified as NS–1808 product. Polytetrafluoroethylene is the preferred material forming the wedging surface and braking surfaces.

One preferred version of a shock absorber device embodying the features of my invention is illustrated in FIGURES 6, 7, 8, 9 (a and b), and 10 (a, b, and c). The vehicle shock absorber unit shown in the figures comprises an elongated flat blade-like member or element 2 to provide at one end with a fixed bushing element 1, for connection to a wheel assembly of the vehicle, the other end of the blade member 2 is slidably received in the open end of hollow tubular member 3. The opposed flat sides of element 2 establish a basis for braking surfaces as will be discussed hereinafter. The other end of the tubular member 3 is closed by element 4 and is provided with suitable means 6, including a threaded stud 5, for connection to the vehicle frame. Two opposed wedge elements 9 and 10 are fixedly positioned and fitted in the interior of tubular element 3, being held against longitudinal movement therein by abutting engagement between an inturned flange 7 and an inwardly projecting abutment 8 in the interior of the tubular element. The wedge elements 9 and 10 are supported radially outwardly against the interior of the tubular element 3 by spacer elements 11, 11', 12, and 12', element 12' not being shown. The spacer elements are interengaged with slots provided in the side edges of wedge elements 9 and 10 and are held in this interengaged position by contact with the inner cylindrical surface of tubular element 3. As shown in FIGURE 7 wedge element 9 is provided with two upwardly converging wedging surfaces 15 and wedge element 10 is provided with two downwardly converging wedging surfaces 15'. Two brake elements 13 and 14 are positioned in the tubular element 3 in opposed engagement between the blade 2 and wedge elements 9 and 10. The brake elements 13 and 14 are each provided with intersecting planar surfaces 16 and 16' respectively which are fitted and positioned against the wedging surfaces 15 and 15' of the wedge elements 9 and 10. The opposed planar surfaces of brake elements 13 and 14 provide the basis for braking surfaces in engagement with braking surfaces on blade member or element 2. Positioned as shown by reference numeral 20 are the bearing strips and contact portions of the special friction material described above. These strips and contact portions operate between the wedging surfaces and frictional braking surfaces.

The brake elements 13 and 14 are resiliently urged into engagement with the blade 2 by springs 17 and 17', the ends of which are secured in holes drilled in the brake elements.

Another pair of tension helical springs 18, 18', are connected by a suitable arrangement between the springs 17 and 17' and the spacer elements 12 and 12', element 12' not shown. The purpose of these springs is to balance the device against the force of gravity. Springs 18, 18' are relatively weak. At rest the weight of the passengers is supported primarily by the main spring acting in parallel to the shock absorber device and between the vehicle frame assembly and wheel assembly. The brake is not developing any retarding force under these static conditions but the brake elements 13 and 14 are in contact with the wedge surfaces and the blade 2.

In operation of the vehicle along a road surface, when the wheel encounters a deviation, upward or downward, which deflects the main spring or displaces the wheel assembly with respect to the frame assembly at a rate of movement below the rate of frame-main spring movement when in resonant motion and which displacement exceeds a given predetermined minimum value, a frictional force between the moving blade 2 (connected to the wheel) and the brake elements 13 and 14 develops and actuates the brake elements against the converging wedge surfaces 16, 16' toward which the frictional force operates. The actuation of the brake elements 13, 14 against the wedge surfaces 16, 16' increases the frictional engagement or normal force between the brake elements 13, 14 and the blade 2 and in turn increases the frictional braking force opposing the blade 2 as the rate of wheel and blade displacement increases. As the retarding force operates between the brake elements 13, 14 connected to the frame and the blade 2 connected to the wheel, the frame is accelerated in a direction tending to reduce the main spring deflection, but at a rate not exceeding its normal resonant movement rate which assures passenger comfort. Eventually the wheel-frame relative rate of displacement and related main spring rate of deflection decreases smoothly to zero. The retarding force between brake elements 13, 14 and the blade 2 likewise decreases smoothly to zero as indicated by the braking force-velocity curves of FIGURE 2. Then the reverse or rebound action of the system takes place, caused by the energy stored in the deflected main spring. This return action occurs at a comfortable rate governed by the natural frequency of the frame-spring combination and upon reversal of relative motion between the blade 2 and the brake elements 13, 14 a smoothly increasing retarding force will be developed to oppose the return action in the same manner as upon initial action. The retarding force on the return action increases smoothly from zero without any sticking, or high initial force to unlock the wedge action as would be encountered in the prior art devices as is indicated in FIGURES 1, 2, and 3. Due to the way the coefficient of friction and braking force drops to substantially zero, or a negligible value, when velocity drops to zero the wedge action is self-unlocking even though very low wedge angles are used to give great normal force multiplication. Such action is not attainable in similar structural arrangements of the prior art. Also due to this variation of frictional braking force with velocity there is an inherent delay in the build-up of significant frictional braking force after relative motion is initiated between the blade 2 and the brake elements even though the brake elements 13, 14 are immediately adjacent the wedging surfaces and in negligible pressure contact with them. The amount of this delay is used to enable the braking device to screen out or ignore wheel-frame displacements below a certain level and above certain uncomfortable rate levels without developing a significant retarding force which would produce an uncomfortable reaction on the frame. The particular levels are controlled by selection of the wedging angles, the coefficient of friction at the rate and normal loading involved, the mass of the brake elements, and the spring force holding the brake elements initially against the blade 2. Of course it may be desirable to additionally use a longitudinal clearance between the brake elements and the wedging surfaces as lost motion space to increase the delay in development in the retarding force but such space is not necessary in the present device. This is one of the significant unique features of the arrangement of this invention, a time delay is created which is unrelated to the traversal of a mass across a given distance. The structural aspects of the device are carefully controlled so that wheel-frame relative displacement above the predetermined level of displacement and at rates of motion at and below the rates of motion at the main spring-frame resonant frequency causes the frictional retarding action to be developed as described while sharp wheel-frame relative displacements at rates of motion above the rate of motion at the main spring-frame natural frequency and below a predetermined level are substantially dissipated or have significantly returned to the equilibrium condition before any significant retarding force, at this high rate, can be developed by the shock absorber and transmitted to the frame. The predetermined levels of displacement are related to the time delay in developing the braking force as discussed above and it is believed both levels are substantially the same magnitude. The displacement levels and rates involved are related to the riding conditions such as railroad crossings and snow chains which should not be retarded by the shock absorber but merely accommodated by small low force main spring deflections near the equilibrium point. It will be seen that wheel deviations or main spring deflections at the higher rate of displacement will be eventually braked if the displacement exceeds the predetermined level involved in the braking time delay. This is desirable since shock absorber action is required under these conditions if bottoming impacts are to be avoided. It is believed that the braking device of this invention enables the cushioned mounting to handle the special problem riding conditions discussed, and operate smoothly bidirectionally in an improved general manner not approached by the prior art devices or conventional commercial practice.

While I have disclosed and described one preferred version of a device embodying my invention in accordance with the patent laws, it is recognized that many modifications within the spirit of my invention will occur to those skilled in the art and all such modifications are intended to be covered by the scope of the following claims.

I claim:

1. An improved braking element for a braking device of the type adapted for use in combination with a resilient means in engagement between two relatively movable bodies to rapidly cushion, and terminate relatively rapidly, relative movements between them in two opposed directions said device comprising a first member operatively connected with one of said bodies, a second member operatively connected with the other of said bodies, a dry sliding friction braking means cooperating with said first and second members to retard the relative motion between said bodies, said braking means comprising a control mechanism to vary its braking action during operation; said improved braking element comprising a structure adapted to be operatively connected to one of said members, and a portion defining a frictional contact braking surface for engagement with an opposed braking surface carried by the other of said members, said frictional contact braking surface essentially comprised of a polymeric fluorocarbon composition selected from the group consisting of poly(tetrafluoroethylene), poly(chlorotrifluoroethylene), and copolymers of tetra fluoroethylene and hexafluoropropylene, said frictional contact braking surface being effective to cooperate with the control mechanism of such a braking device to retard, relatively rapidly, a first type of relative motion in both opposing directions between said bodies above a given predetermined critical displacement at rates of relative motion equal to or less than the rate of relative motion of one of said bodies at the natural frequency of harmonic movement of said one body and the resilient means, and to significantly reduce, to lesser finite levels, the total bidirectional retarding action for a second type relative motion between the bodies at rates greater than the rate of relative motion of said one of said bodies at the natural frequency of harmonic movement of said one body and the resilient means.

2. An improved braking element for a braking device of the type adapted for use in combination with a resilient means in engagement between two relatively movable bodies to cushion, and terminate in a relatively short time period, relative movements between them in two opposed directions, said device comprising a first member operatively connected with one of said bodies, a second member operatively connected with the other of said bodies, a dry sliding friction braking means cooperating with said first and second members to retard the relative movement between said bodies, said braking means comprising a brake element carried by one of said members, and another brake element carried by said other of said members, said elements comprising opposed friction braking surfaces, said braking means further comprising a wedge unit operatively engaged with one of said elements to increase the pressure of one element against the other in a direction normal to the direction of relative movement between said bodies as relative displacement occurs between said bodies and said elements, said unit comprising a wedging means cooperating with a portion of said one of said elements; said improved braking element comprising a structure adapted to be operatively connected to one of said members, said structure comprising a first portion defining a frictional contact braking surface for opposed engagement with said other brake element of the device and said structure further comprising a second portion having a surface constructed and arranged for operative engagement with said wedging means of said device, said surfaces essentially comprised of a polymeric fluorocarbon composition selected from the group possessing coefficients of friction which, in some significant range of velocities, increase with velocity and, in some significant range of normal loading, decrease with increased normal loading to retard, relatively rapidly, a first type of relative motion in both opposing directions between said bodies above a given predetermined critical displacement at rates of relative motion equal to or less than the rate of relative motion of one of said bodies at the natural frequency of harmonic movement of said one body and the resilient means, and to significantly reduce, to lesser finite levels, the total bidirectional retarding action for a second type relative motion between the bodies at rates greater than the rate of relative motion of said one of said bodies at the natural frequency of harmonic movement of said one body and the resilient means.

3. An improved braking device of the type which may be adapted for use in combination with a resilient means in engagement between two relatively movable bodies to significantly cushion relative movements between them in two opposing directions, said device comprising a first member operatively connected with one of said bodies, a second member operatively connected with the other of said bodies, and a frictional braking means cooperating with said first and second members to retard relative movement between said bodies in both said directions, said device further comprising at least one braking element operatively connected to one of said members and at least one other braking element operatively connected to the other of said members, said elements comprising opposed friction surfaces, each of said opposed surfaces comprising at least one frictional contact portion, a force-multiplying control mechanism cooperating with each of said braking elements supporting and maintaining the opposed surfaces in frictional contact with each other, said mechanism constructed and arranged with respect to said brake elements, said members, and said bodies to force the opposed surfaces into sharply increasing frictional engagement with each other as a relative displacement occurs in said opposed two directions between the two bodies and to release the frictional engagement as such a relative displacement ceases, said force-multiplying control mechanism comprising at least one wedge unit supported by one of said members, said wedge unit operatively engaged with one of said braking elements to increase the pressure of one braking element against the other in a direction normal to the direction of relative movement between said bodies and braking elements as relative displacement occurs between said bodies and said elements, bearing means operatively associated with the wedging surfaces of said wedge unit, said bearing means and said frictional contact portions of said braking elements essentially comprised of a polymeric fluorocarbon composition selected from the group consisting of poly(tetrafluoroethylene), poly(chlorotrifluoroethylene), and copolymers of tetrafluoroethylene and hexafluoropropylene, said braking element frictional contact portion, and said control mechanism cooperating to retard, relatively rapidly, a first type of relative motions in both opposing directions between said bodies above a given predetermined critical displacement at rates of relative motion equal to or less than the rate of relative motion of one of said bodies at the natural frequency of harmonic movement of said one body and the resilient means, and to significantly reduce, to lesser finite levels, the total bidirectional retarding action for a second type relative motion between the bodies at rates greater than the rate of relative motion of said one of said bodies at the natural frequency of harmonic movement of said one body and the resilient means.

4. The improved device of claim 3 in which the mass of the braking elements, the effective angle of said wedge unit and the effective coefficient of friction between the braking elements and between the engaged braking elements and the wedge unit are selected such that high rate of displacement relative motion impulses of one body with respect to the other below a certain predetermined displacement are substantially completed and dissipated before said engaged braking elements and wedge units become effective to develop any significant retarding force, and such that the brake elements and wedge units are self-unlocking, developing no initial retarding force to initiation of a succeeding relative displacements between the bodies after a first displacement has been terminated by braking action of the device.

5. An improved braking device of the type which may be adapted for use in combination with a resilient means in engagement between two relatively movable bodies to cushion relatively rapidly relative movements between them in two opposing directions, said device comprising a first member operatively connected with one of said bodies, a second member operatively connected with the other of said bodies, and a dry sliding friction braking means cooperating with said first and second members to retard relative movement between said bodies in both said directions, said dry sliding friction braking means comprising at least one braking element operatively connected to one of said members and at least one other braking element operatively connected to the other of said members, said elements comprising opposed friction surfaces, each of said opposed surfaces comprising at least one frictional contact portion, a force-multiplying control mechanism cooperating with each of said braking elements supporting and maintaining the opposed surfaces in frictional contact with each other, said mechanism constructed and arranged with respect to said brake elements, said members, and said bodies to force the opposed surfaces into sharply increasing frictional engagement with each other as a relative displacement occurs in both said opposed two directions between the two bodies and to release the frictional engagement as such a relative displacement ceases, said frictional contact portions of said braking elements essentially comprised of a composition having a coefficient of friction for static conditions no higher than its coefficient of friction for moving conditions, said braking element contact portions and said control mechanism cooperating to retard relatively rapidly, a first type of relative motions in both opposing directions between said bodies above a given predetermined critical displacement at rates of relative motion equal to or less than the rate of relative motion of one of said bodies at the natural frequency of harmonic movement of said one body and the resilient means, and to significantly reduce, to lesser finite levels, the total bidirectional retarding action for a second type relative motion between the bodies at rates greater than the rate of relative motion of said one of said bodies at the natural frequency of harmonic movement of said one body and the resilient means.

References Cited in the file of this patent

UNITED STATES PATENTS

| | | |
|---|---|---|
| 1,260,019 | Oliver | Mar. 19, 1918 |
| 2,960,280 | Connelly | Nov. 15, 1960 |

FOREIGN PATENTS

| | | |
|---|---|---|
| 1,096,602 | France | Feb. 2, 1955 |